US011880662B2

(12) United States Patent
Korhonen

(10) Patent No.: US 11,880,662 B2
(45) Date of Patent: *Jan. 23, 2024

(54) MATRIX BASED BOT IMPLEMENTATION

(71) Applicant: Microsoft Technology Licensing, LLC, Redmond, WA (US)

(72) Inventor: Jokko Korhonen, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 93 days.

This patent is subject to a terminal disclaimer.

(21) Appl. No.: 17/343,605

(22) Filed: Jun. 9, 2021

(65) Prior Publication Data

US 2021/0303799 A1 Sep. 30, 2021

Related U.S. Application Data

(63) Continuation of application No. 16/537,378, filed on Aug. 9, 2019, now Pat. No. 11,055,494.

(51) Int. Cl.
*G06F 40/30* (2020.01)
*G06N 20/00* (2019.01)

(52) U.S. Cl.
CPC ............ *G06F 40/30* (2020.01); *G06N 20/00* (2019.01)

(58) Field of Classification Search
CPC ........................................................ G06F 40/30
See application file for complete search history.

(56) References Cited

U.S. PATENT DOCUMENTS

| | | | | |
|---|---|---|---|---|
| 11,055,494 | B2 * | 7/2021 | Korhonen | G06F 40/35 |
| 2011/0302451 | A1 * | 12/2011 | Smith | G06F 11/3672 709/248 |
| 2015/0227559 | A1 * | 8/2015 | Hatami-Hanza | G06N 5/02 707/794 |
| 2016/0063085 | A1 * | 3/2016 | De Kock | G06F 3/0484 707/737 |
| 2016/0335340 | A1 * | 11/2016 | Bailey | G06F 16/285 |
| 2018/0143968 | A1 * | 5/2018 | Yang | G06F 40/35 |
| 2018/0174020 | A1 * | 6/2018 | Wu | G06N 3/08 |
| 2019/0251169 | A1 * | 8/2019 | Loghmani | G06F 40/295 |
| 2019/0392824 | A1 * | 12/2019 | Koo | G06F 16/3347 |
| 2020/0143265 | A1 * | 5/2020 | Jonnalagadda | G06N 3/045 |
| 2020/0227026 | A1 * | 7/2020 | Rajagopal | G06F 16/244 |
| 2021/0303799 | A1 * | 9/2021 | Korhonen | G06F 9/45512 |

* cited by examiner

*Primary Examiner* — Kevin Ky
(74) *Attorney, Agent, or Firm* — Mannava & Kang, P.C.

(57) ABSTRACT

In some examples, matrix based bot implementation may include obtaining, for a plurality of bots that are used to respond to a query, a matrix that includes entries including a plurality of scenarios, a plurality of questions corresponding to the plurality of scenarios, and a plurality of responses. Each response may correspond to a specified question. A plurality of scripts may be generated based on an analysis of the matrix. Each script may include at least one question followed by at least one response, and further followed by at least one scenario. For each script, a closest pre-existing script may be identified based on a comparison of the script to pre-existing scripts. For each script, a modification to the matrix may be generated based on a difference in the script from the closest pre-existing script. The bots may be utilized to respond to the query based on the modified matrix.

18 Claims, 9 Drawing Sheets

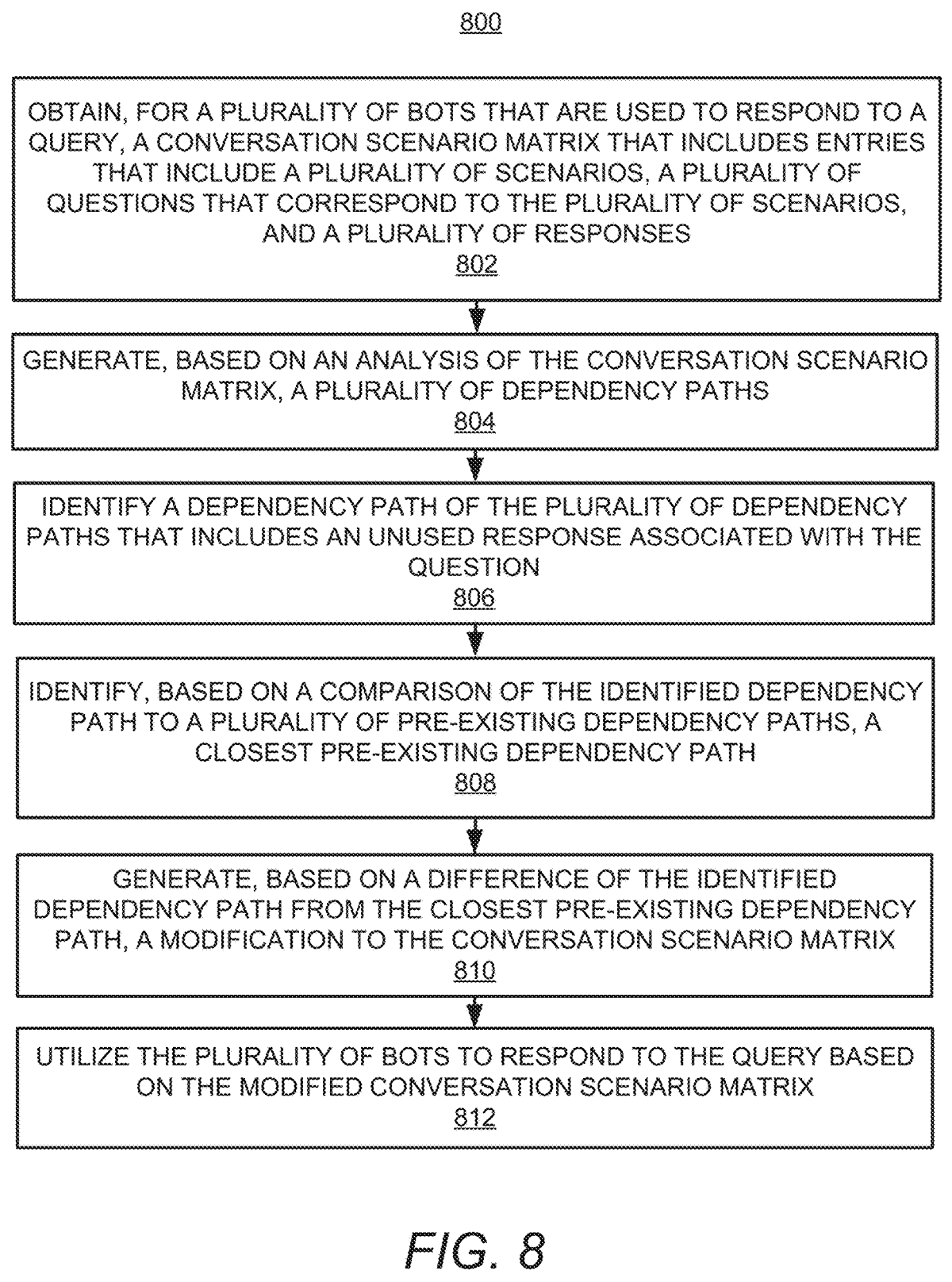

800

OBTAIN, FOR A PLURALITY OF BOTS THAT ARE USED TO RESPOND TO A QUERY, A CONVERSATION SCENARIO MATRIX THAT INCLUDES ENTRIES THAT INCLUDE A PLURALITY OF SCENARIOS, A PLURALITY OF QUESTIONS THAT CORRESPOND TO THE PLURALITY OF SCENARIOS, AND A PLURALITY OF RESPONSES
802

GENERATE, BASED ON AN ANALYSIS OF THE CONVERSATION SCENARIO MATRIX, A PLURALITY OF DEPENDENCY PATHS
804

IDENTIFY A DEPENDENCY PATH OF THE PLURALITY OF DEPENDENCY PATHS THAT INCLUDES AN UNUSED RESPONSE ASSOCIATED WITH THE QUESTION
806

IDENTIFY, BASED ON A COMPARISON OF THE IDENTIFIED DEPENDENCY PATH TO A PLURALITY OF PRE-EXISTING DEPENDENCY PATHS, A CLOSEST PRE-EXISTING DEPENDENCY PATH
808

GENERATE, BASED ON A DIFFERENCE OF THE IDENTIFIED DEPENDENCY PATH FROM THE CLOSEST PRE-EXISTING DEPENDENCY PATH, A MODIFICATION TO THE CONVERSATION SCENARIO MATRIX
810

UTILIZE THE PLURALITY OF BOTS TO RESPOND TO THE QUERY BASED ON THE MODIFIED CONVERSATION SCENARIO MATRIX
812

*FIG. 8*

MATRIX BASED BOT IMPLEMENTATION

PRIORITY

The present application is a Continuation of commonly assigned and co-pending U.S. patent application Ser. No. 16/537,378, filed Aug. 9, 2019, which is incorporated by reference in its entirety.

BACKGROUND

A bot may be described as an autonomous program that may be utilized, for example, to respond to queries by a user. A query may generally include any type of request by the user, for example, to obtain information or to complete a task. A variety of techniques may be used to control operation of bots. For example, a bot, or a set of bots, may follow a set of pre-specified questions and responses to respond to queries by a user. In this regard, it is technically challenging to control operation of bots to accurately and efficiently respond to the queries by the user.

BRIEF DESCRIPTION OF DRAWINGS

Features of the present disclosure are illustrated by way of example and not limited in the following figure(s), in which like numerals indicate like elements, in which:

FIG. 8 illustrates a flowchart of an example method for matrix based bot implementation in accordance with an embodiment of the present disclosure.

DETAILED DESCRIPTION

Figure 1:
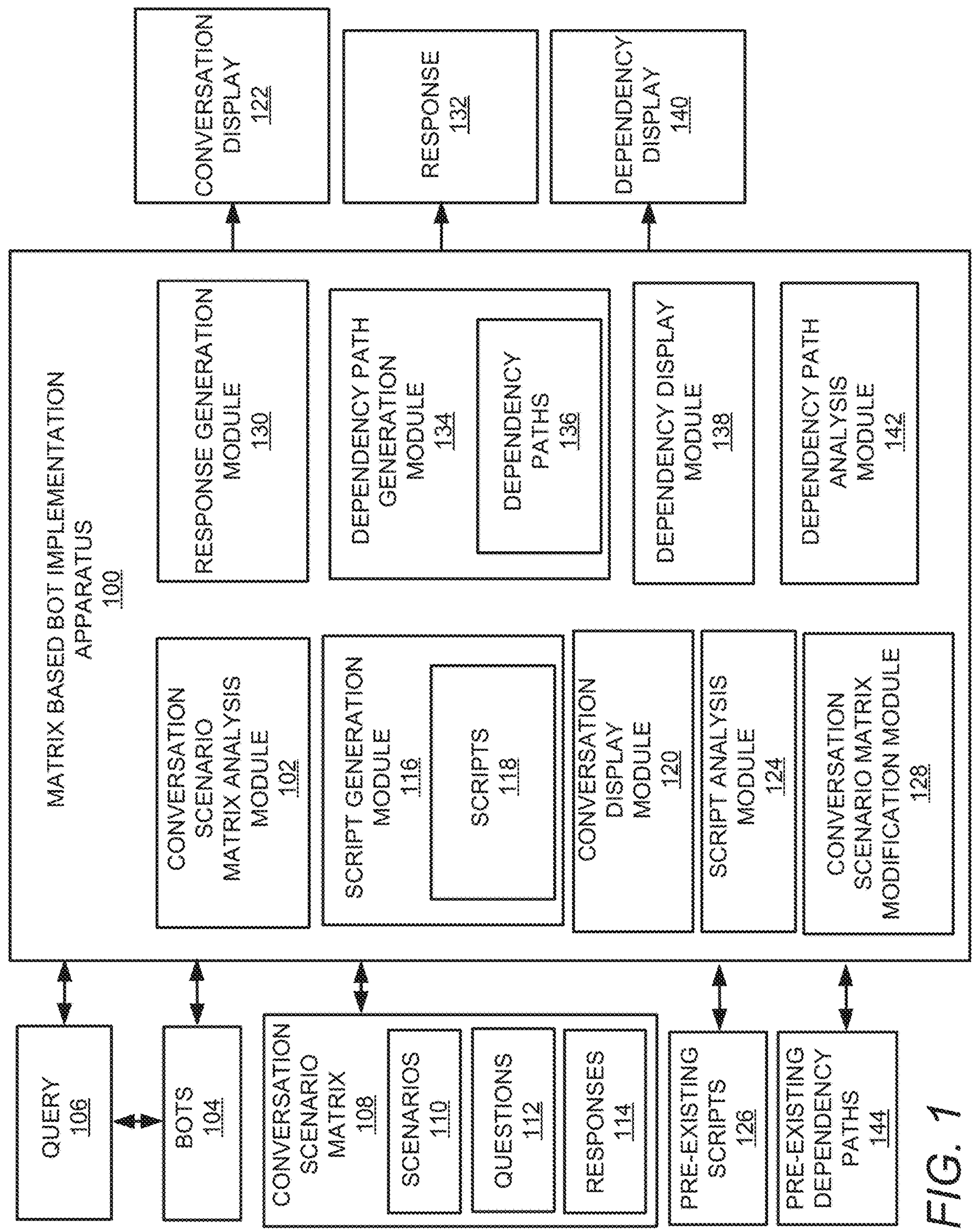
FIG. 1 illustrates a layout of a matrix based bot implementation apparatus in accordance with an embodiment of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Matrix based bot implementation apparatuses, methods for matrix based bot implementation, and non-transitory computer readable media having stored thereon machine readable instructions to provide matrix based bot implementation are disclosed herein. The apparatuses, methods, and non-transitory computer readable media disclosed herein provide for analysis of a conversation display matrix, which may be used to control a bot or a set of bots, and generation of scripts and dependency paths. The scripts may be analyzed and displayed in a conversation display, and the dependency paths may be analyzed and displayed in a dependency display. The scripts and dependency paths may be analyzed to minimize errors in the conversation display matrix, where a modified conversation display matrix may be used to control operation of a bot or a set of bots to accurately and efficiently respond to queries by a user.

As disclosed herein, a variety of techniques may be used to control operation of bots. An example of such techniques may include the utilization of a conversation scenario matrix. A conversation scenario matrix may provide for the implementation of non-linear conversations between a bot or a set of bots and a user. For example, instead of a bot or a set of bots following a linear set of questions and responses to respond to a query, the conversation scenario matrix may include a non-linear structure that includes a set of questions and responses associated with a solution or an outcome. For example, a conversation scenario matrix may include entries including a plurality of scenarios, a plurality of questions corresponding to the plurality of scenarios, and a plurality of responses. Each response may correspond to a specified question of the plurality of questions. For a primary issue that is addressed by a conversation scenario matrix, scenarios may represent different sub-issues of the primary issue that is addressed in the conversation scenario matrix.

Controlling operation of a set of bots that utilize a conversation scenario matrix is technically challenging in that a conversation scenario matrix may include an extensive set of entries that include scenarios, responses, and questions that may include erroneous dependencies and conversation layouts (e.g., scripts as disclosed herein). Thus, it is technically challenging to minimize errors associated with a conversation scenario matrix to control operation of a bot or a set of bots to accurately and efficiently respond to queries by a user.

In order to address at least the aforementioned technical challenges, the apparatuses, methods, and non-transitory computer readable media disclosed herein provide for generation of scripts that may be displayed in a conversation display, and dependency paths that may be displayed in a dependency display. The scripts and dependency paths may translate a structure and contents of the matrix into other structures that may be used to identify errors in the matrix. In this regard, the generated scripts may be analyzed to identify errors such as scripts that do not follow a pattern specified, for example, in a pre-existing script. The generated dependency paths may be analyzed to identify errors such as dependencies that include an unused response associated with a question, dependencies that include a missing unique response, etc. The identified errors with respect to the scripts and the dependency paths may be used to modify the conversation scenario matrix. The modified conversation scenario matrix may be used to accurately and efficiently respond to a query. For example, the modified conversation scenario matrix may be used to minimize computer resource utilization with respect to operation of bots that may otherwise follow erroneous paths in a conversation scenario matrix. In some circumstances, the erroneous paths may lead to an endless repetition of paths without the generation of a response to a query, and thus inefficient computer resource utilization with respect to operation of the bots.

With respect to dependencies, in a given scenario and across scenarios covered by a matrix, there may be a dependency on a sequence in which questions are to be asked. The sequence of questions may need to be predefined due to policy or branding conventions. In this regard, reviewing a set of scripts may show in which order questions are asked by a bot. Script by script tweaks may be performed to ensure that policy or brand conventions are followed.

With respect to other issues that may be addressed more efficiently with script and dependency analysis as disclosed herein, in the case of updating responses to a question by either adding, removing or modifying responses, the ability to analyze, from the perspective of the response, dependent scenarios that are being modified may facilitate validation of an update. For example, when a response is modified, scenario outcomes or related questions in a scenario may be verified to determine whether they operate correctly (e.g., to ensure that the scenarios are coherent).

With respect to questions that are asked by a bot, a number of questions asked by a bot may be minimized to obtain a correct outcome. In this regard, the aforementioned scripts may be analyzed to determine an average number of questions that are being asked in a matrix to achieve a scenario outcome, and to thus adjust a level of details covered by a question. For example, if an average number of questions exceeds a specified threshold, the level of details covered by a question may be adjusted so as to reduce the average number of questions.

For the apparatuses, methods, and non-transitory computer readable media disclosed herein, modules, as described herein, may be any combination of hardware and programming to implement the functionalities of the respective modules. In some examples described herein, the combinations of hardware and programming may be implemented in a number of different ways. For example, the programming for the modules may be processor executable instructions stored on a non-transitory machine-readable storage medium and the hardware for the modules may include a processing resource to execute those instructions. In these examples, a computing device implementing such modules may include the machine-readable storage medium storing the instructions and the processing resource to execute the instructions, or the machine-readable storage medium may be separately stored and accessible by the computing device and the processing resource. In some examples, some modules may be implemented in circuitry.

FIG. 1 illustrates a layout of an example matrix based bot implementation apparatus (hereinafter also referred to as "apparatus 100").

Referring to FIG. 1, the apparatus 100 may include a conversation scenario matrix analysis module 102 to obtain, for a plurality of bots 104 that are used to respond to a query 106, a conversation scenario matrix 108 that includes entries including a plurality of scenarios 110, a plurality of questions 112 corresponding to the plurality of scenarios 110, and a plurality of responses 114. Each response of the plurality of responses 114 may correspond to a specified question of the plurality of questions 112.

A script generation module 116 may generate, based on an analysis of the conversation scenario matrix 108, a plurality of scripts 118. Each script of the plurality of scripts 118 may include at least one question of the plurality of questions 112, followed by at least one response of the plurality of responses 114, and further followed by at least one scenario of the plurality of scenarios 110.

A conversation display module 120 may generate a visual display (e.g., a conversation display 122) of at least one script of the plurality of scripts 118.

For each script of the plurality of scripts, a script analysis module 124 may identify, based on a comparison of the script to a plurality of pre-existing scripts 126, a closest pre-existing script.

For each script of the plurality of scripts, a conversation scenario matrix modification module 128 may generate, based on a difference in the script from the closest pre-existing script, a modification to the conversation scenario matrix 108.

According to examples disclosed herein, the conversation scenario matrix modification module 128 may generate, based on the difference in the script from the closest pre-existing script, the modification to the conversation scenario matrix 108 by modifying the at least one question, the at least one response, and/or the at least one scenario of the script to correspond to the closest pre-existing script.

A response generation module 130 may utilize the plurality of bots 104 to generate a response 132 to the query 106 based on the modified conversation scenario matrix.

A dependency path generation module 134 may generate, based on the analysis of the conversation scenario matrix 108, a plurality of dependency paths 136. Each dependency path of the plurality of dependency paths 136 may include a question of the plurality of questions 112, followed by responses associated the question, and further followed by one or more scenarios associated with the responses associated the question.

A dependency display module 138 may generate a visual display (e.g., a dependency display 140) of at least one dependency path of the plurality of dependency paths 136.

A dependency path analysis module 142 may identify a dependency path of the plurality of dependency paths 136 that includes an unused response associated with the question. The dependency path analysis module 142 may identify, based on a comparison of the identified dependency path to a plurality of pre-existing dependency paths 144, a closest pre-existing dependency path.

The conversation scenario matrix modification module 128 may generate, based on a difference of the identified dependency path from the closest pre-existing dependency path, a further modification to the conversation scenario matrix 108. The response generation module 130 may utilize the plurality of bots 104 to generate the response 132 to the query 106 based on the further modified conversation scenario matrix.

According to examples disclosed herein, the conversation scenario matrix modification module 128 may generate, based on the difference of the identified dependency path from the closest pre-existing dependency path, the further modification to the conversation scenario matrix 108 by determining whether a match percentage of the identified dependency path to the closest pre-existing dependency path exceeds a specified threshold. Based on a determination that the match percentage of the identified dependency path to the closest pre-existing dependency path exceeds the specified threshold, the dependency path analysis module 142 may modify the identified dependency path to correspond to the closest pre-existing dependency path.

According to examples disclosed herein, the dependency path analysis module 142 may identify a dependency path of the plurality of dependency paths 136 that includes a missing unique response. The dependency path analysis module 142 may identify, based on a comparison of the identified dependency path to the plurality of pre-existing dependency paths 144, a closest pre-existing dependency path. Further, the conversation scenario matrix modification module 128 may generate, based on a difference of the identified dependency path from the closest pre-existing dependency path, a further modification to the conversation scenario matrix 108. The response generation module 130 may utilize the plurality of bots 104 to generate the response 132 to the query based on the further modified conversation scenario matrix.

According to examples disclosed herein, the conversation scenario matrix modification module 128 may generate, based on the difference of the identified dependency path from the closest pre-existing dependency path, the further modification to the conversation scenario matrix 108 by determining whether a match percentage of the identified dependency path to the closest pre-existing dependency path exceeds a specified threshold. Based on a determination that the match percentage of the identified dependency path to the closest pre-existing dependency path exceeds the specified threshold, the dependency path analysis module 142 may modify the identified dependency path to correspond to the closest pre-existing dependency path.

Operation of the apparatus 100 is described in further detail with reference to FIGS. 1-6.

Figure 2:
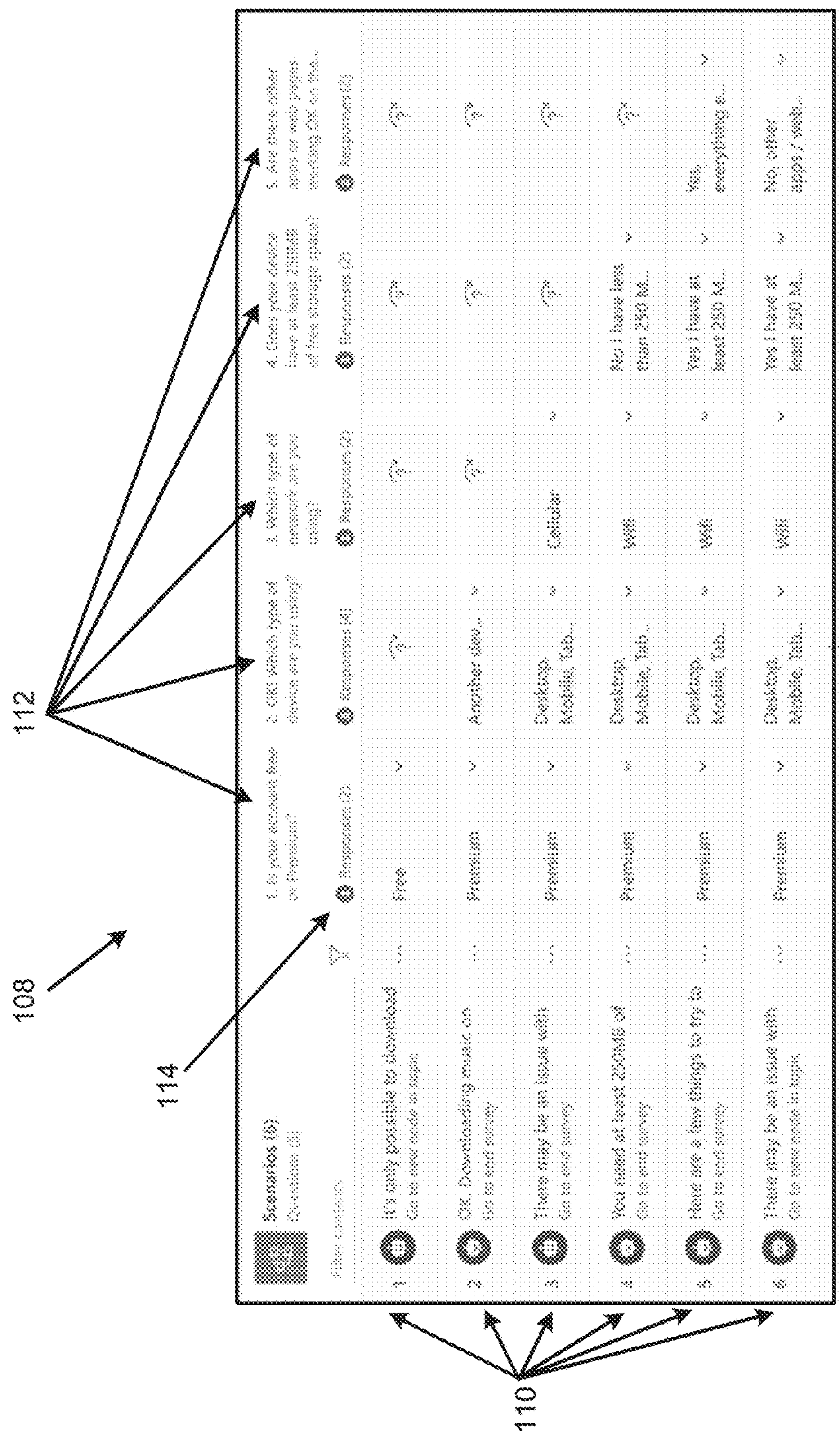
FIG. 2 illustrates a conversation scenario matrix to illustrate operation of the matrix based bot implementation apparatus of FIG. 1 in accordance with an embodiment of the present disclosure.

FIG. 2 illustrates a conversation scenario matrix to illustrate operation of the apparatus 100 in accordance with an embodiment of the present disclosure.

Referring to FIGS. 1 and 2, and particularly FIG. 2, as disclosed herein, the conversation scenario matrix 108 may include entries including the plurality of scenarios 110, the plurality of questions 112 corresponding to the plurality of scenarios 110, and the plurality of responses 114. Each response of the plurality of responses 114 may correspond to a specified question of the plurality of questions 112. For example, the conversation scenario matrix 108 of FIG. 2 may include scenarios 1-6, questions 1-5, and corresponding responses displayed below the questions. For example, as shown in FIG. 2, a scenario "It's only possible to download . . . " may include a corresponding question as "Is your account free or Premium?", with two responses being specified as "Free" or "Premium". Another scenario shown in FIG. 2 may specify "Ok. Downloading music on . . . " and include a corresponding question as "OK! Which type of device are you using?", with four responses being specified as "Another device", "Desktop", "Mobile", and/or "Tablet". In this manner, the conversation scenario matrix 108 may include scenarios, questions, and responses that may be used to control the bots 104 in a non-linear manner as a user may be presented with various questions and response options as different scenarios are addressed by the bots 104.

Figure 3:
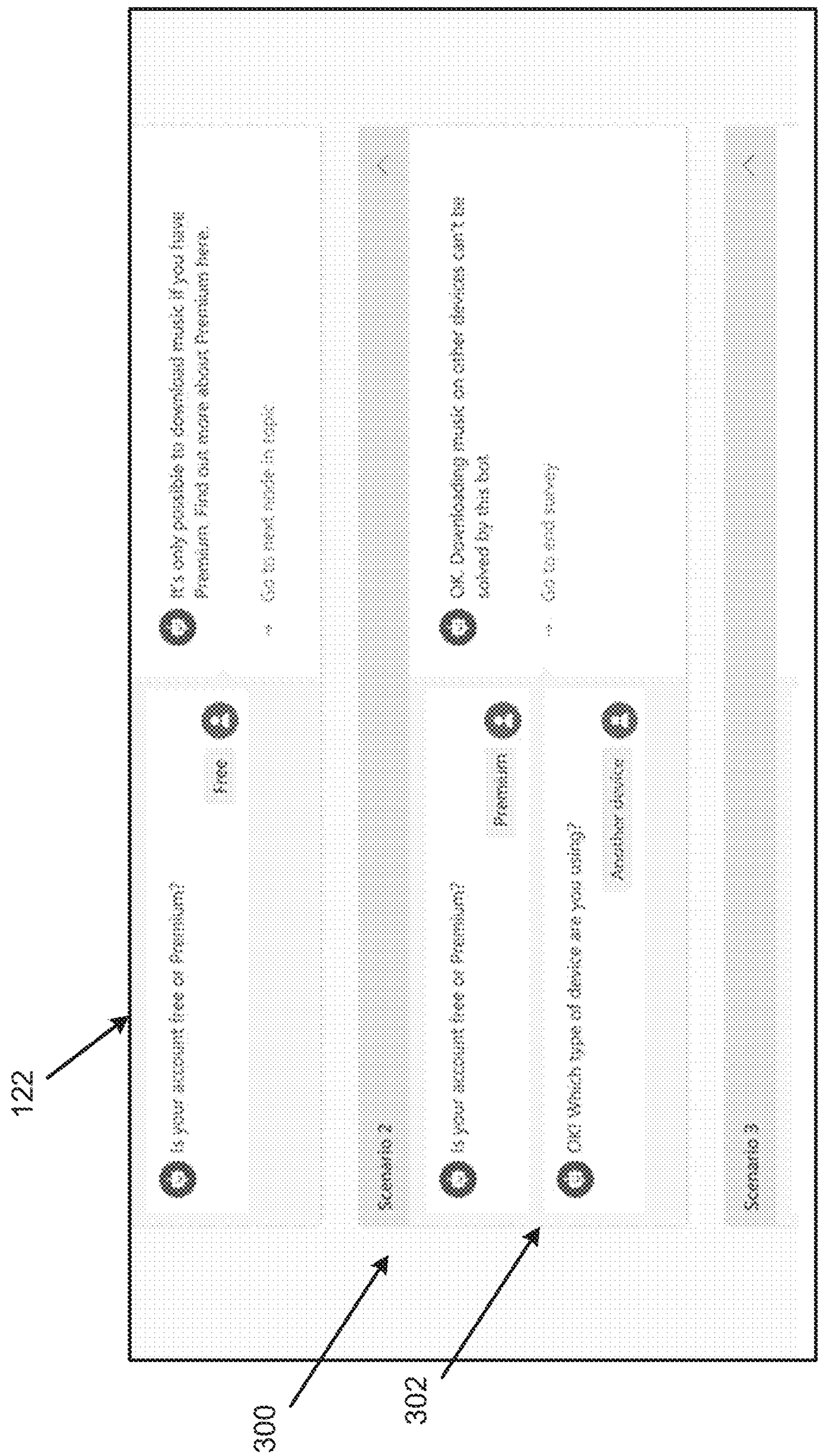
FIG. 3 illustrates a conversation display to illustrate operation of the matrix based bot implementation apparatus of FIG. 1 in accordance with an embodiment of the present disclosure.

FIG. 3 illustrates a conversation display to illustrate operation of the apparatus 100 in accordance with an embodiment of the present disclosure.

Referring to FIGS. 1 and 3, and particularly FIG. 3, as disclosed herein, the script generation module 116 may generate, based on an analysis of the conversation scenario matrix 108, the plurality of scripts 118. Each script of the plurality of scripts 118 may include at least one question of the plurality of questions 112, followed by at least one response of the plurality of responses 114, and further followed by at least one scenario of the plurality of scenarios 110. For example, the script generation module 116 may analyze, for each scenario, corresponding questions and responses that result in the scenario. In this regard, the script generation module may identify, based, for example, on utilization of a machine learning model that is trained using a set of training scripts, questions and responses that results in a scenario.

For example, with respect to the conversation scenario matrix 108 of FIG. 2, a script at 300 for scenario-2 of FIG. 2 may include a question "Is your account free or Premium?", followed by a response "Premium", followed by a question "OK! Which type of device are you using?", followed by a response "Another device", and further followed by scenario-2 of FIG. 2 (e.g., "OK. Downloading music on other devices can't be solved by the bot".

Figure 4:
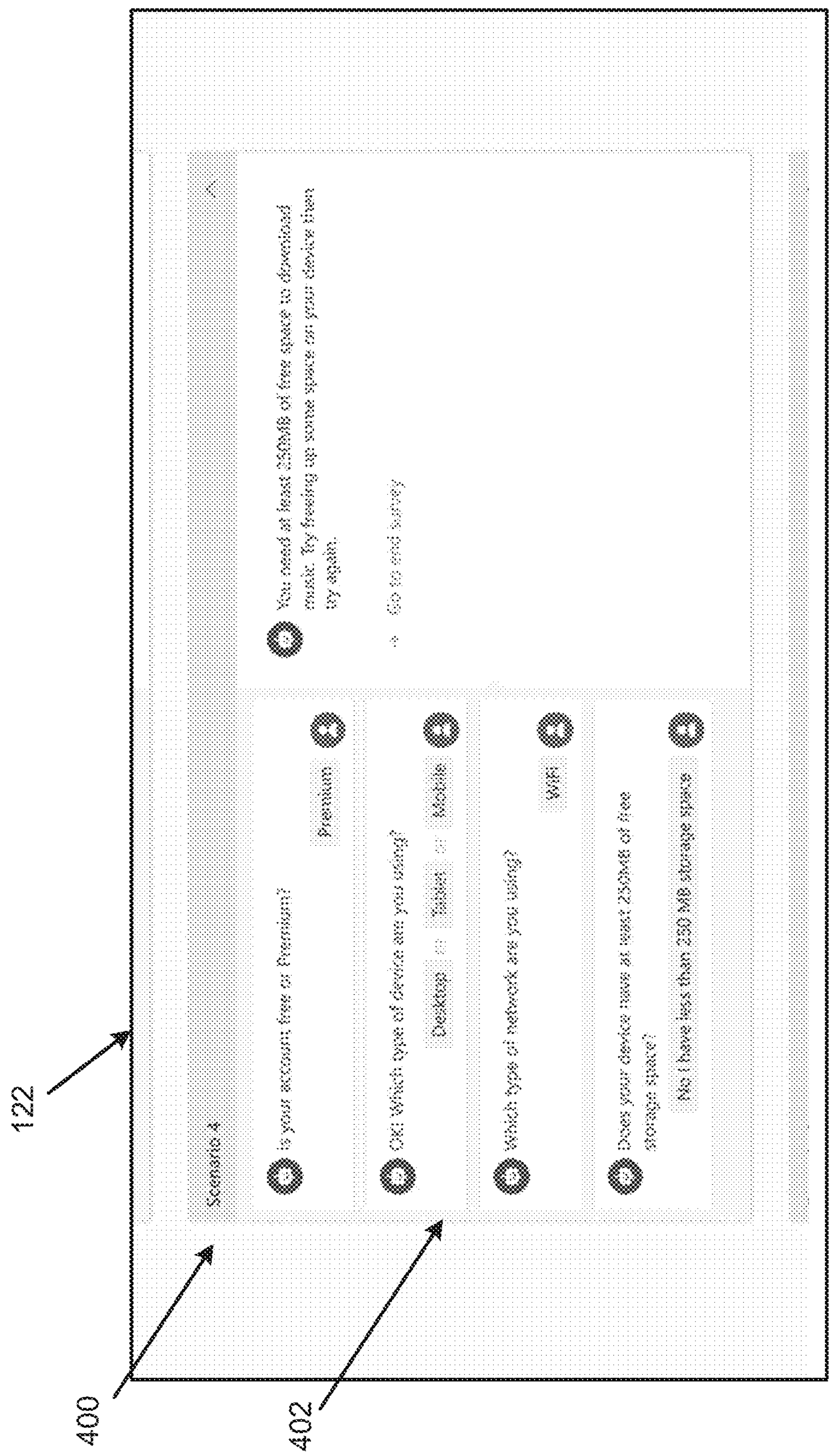
FIG. 4 illustrates another conversation display to illustrate operation of the matrix based bot implementation apparatus of FIG. 1 in accordance with an embodiment of the present disclosure.

FIG. 4 illustrates another conversation display to illustrate operation of the apparatus 100 in accordance with an embodiment of the present disclosure.

For FIG. 4, a script at 400 for scenario-4 of FIG. 2 may include a question "Is your account free or Premium?", followed by a response "Premium", followed by a question "OK! Which type of device are you using?", followed by responses "Desktop", "Tablet", and "Mobile", followed by a question "Which type of network are you using", followed by a response "WiFi", followed by a question "Does your device have at least 250 MB of free storage space?", followed by a response "No I have less than 250 MB storage space", and further followed by scenario-4 of FIG. 2 (e.g., "You need at least 250 MB of free space to download music. Try freeing up some space on your device then try again".

With respect to operation of the script analysis module 124, as disclosed herein, for each script, the script analysis module 124 may identify, based on a comparison of the script to a plurality of pre-existing scripts 126, a closest pre-existing script. For the example of FIG. 4, assuming that the closest pre-existing script includes the question and response entries for the script 400 of FIG. 4 and including a further question of "Do you prefer cloud storage or local storage on your computer", followed by a response "local storage", and further followed by scenario-4 of FIG. 2 (e.g., "You need at least 250 MB of free space to download music. Try freeing up some space on your device then try again", in this regard, the conversation scenario matrix modification module 128 may generate, based on the difference in the script from the closest pre-existing script, the modification to the conversation scenario matrix 108 by modifying the question options to add the question "Do you prefer cloud storage or local storage on your computer", and the associated response options to add the responses "cloud storage" and "local storage". If the user instead selects the response "cloud storage", the conversation scenario matrix 108 may be modified, based on another closest pre-existing script, to include another corresponding scenario (e.g., "Please sign up for cloud storage at the following link").

With respect to the analysis performed by the conversation scenario matrix modification module 128 to determine the difference in the script from the closest pre-existing script, the conversation scenario matrix modification module 128 may determine scores, such as an order score and an inclusivity score, with respect to the questions, responses, and scenarios specified in a script. For example, the order score may represent a percentage match of an order of questions and responses for a script compared to the closest pre-existing script. In this regard, each out-of-order question or response may be assigned a negative value, and all other questions and responses may be assigned a positive value. The inclusivity score may represent a percentage match of questions and responses that are included in a script compared to the closest pre-existing script. In this regard, each missing question or response may be assigned a negative value, and all other questions and responses may be assigned a positive value. These negative and positive values for the order score and the inclusivity score may be added and utilized to respectively determining whether to modify the conversation scenario matrix 108. For example, the conversation scenario matrix 108 may be modified if the order score and/or the inclusivity score are below a specified threshold (e.g., 98%, with the combined or separate score values being converted to a percentage value).

The response generation module 130 may utilize the plurality of bots 104 to generate the response 132 to the query 106 based on the modified conversation scenario matrix. For example, assuming that the query 106 specifies "I am having trouble downloading music to my system", based on scenario-4 analyzed per the modified conversation scenario matrix that includes the further question of "Do you prefer cloud storage or local storage on your computer", followed by response options to add the responses "cloud storage" and "local storage", the response 132 to the query 106 may be specified as "You need at least 250 MB of free space to download music. Try freeing up some space on your device then try again" assuming that the selected response indicates "local storage" as discussed above.

With respect to the conversation display 122 of FIGS. 1, 3, and 4, each script may be displayed as a card, for example, as shown at 302 and 402 of FIGS. 3 and 4, respectively. Each card may display a collection of questions asked by a bot, and the expected responses. Further, each card may display a solution specified as the scenario, where the solution may be displayed or executed by a bot once the specified responses to that solution have been obtained and/or satisfied. In this manner, the conversation display 122 may also provide a visual display to facilitate understanding of questions and responses that may be associated with a scenario.

Figure 5:
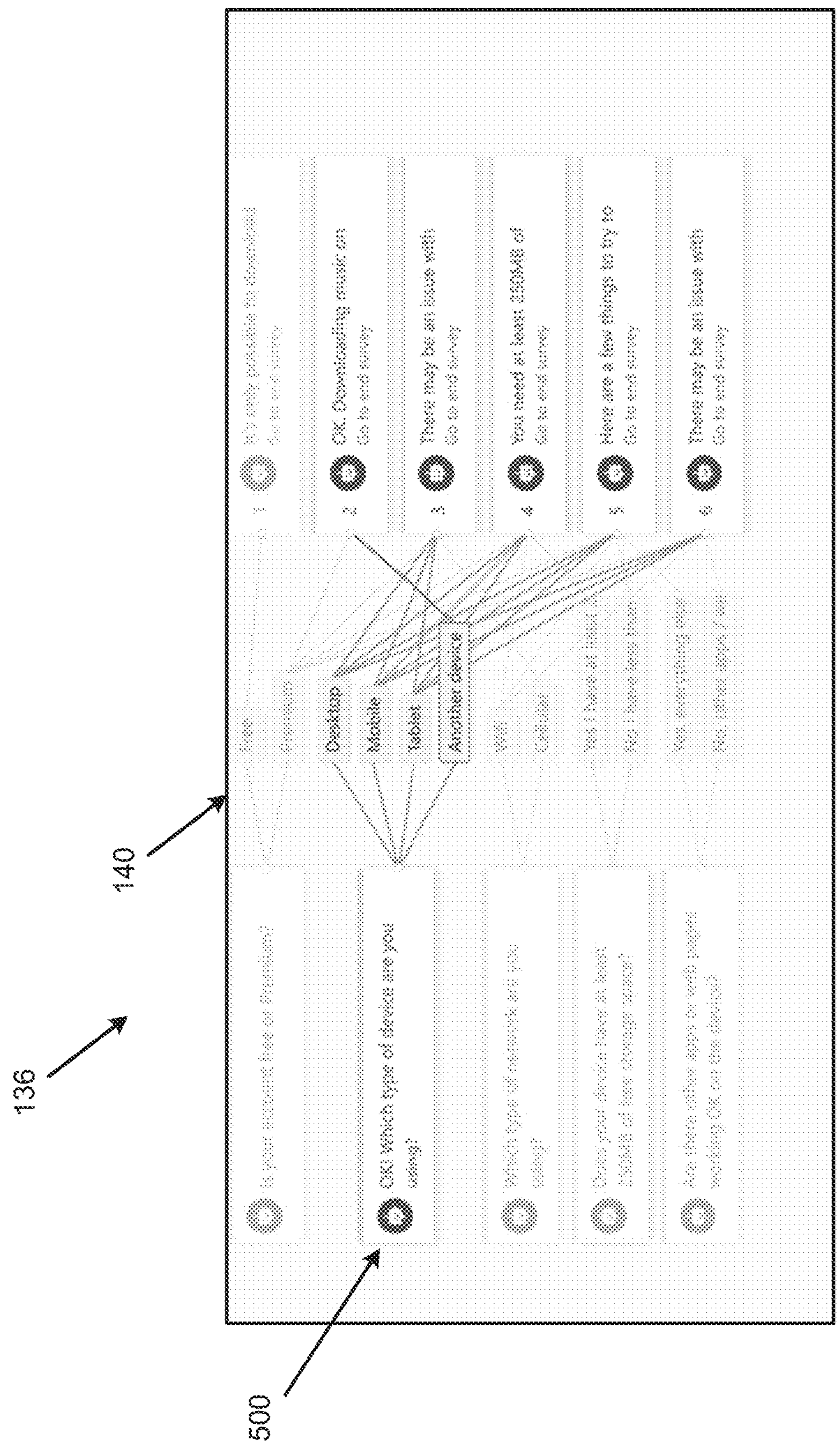
FIG. 5 illustrates a dependency display to illustrate operation of the matrix based bot implementation apparatus of FIG. 1 in accordance with an embodiment of the present disclosure.

FIG. 5 illustrates a dependency display to illustrate operation of the apparatus 100 in accordance with an embodiment of the present disclosure.

Referring to FIGS. 1 and 5, and particularly FIG. 5, as disclosed herein, the dependency path generation module 134 may generate, based on the analysis of the conversation scenario matrix 108, the plurality of dependency paths 136. Each dependency path of the plurality of dependency paths 136 may include a question of the plurality of questions 112, followed by responses associated the question, and further followed by one or more scenarios associated with the responses associated the question. For example, as shown in FIG. 5, a dependency path 500 may include a question "OK! Which type of device are you using?", followed by responses "Another device", "Desktop", "Mobile", and "Tablet", and further followed by (e.g., associated with) scenarios 2-6 of FIG. 2.

Figure 6:
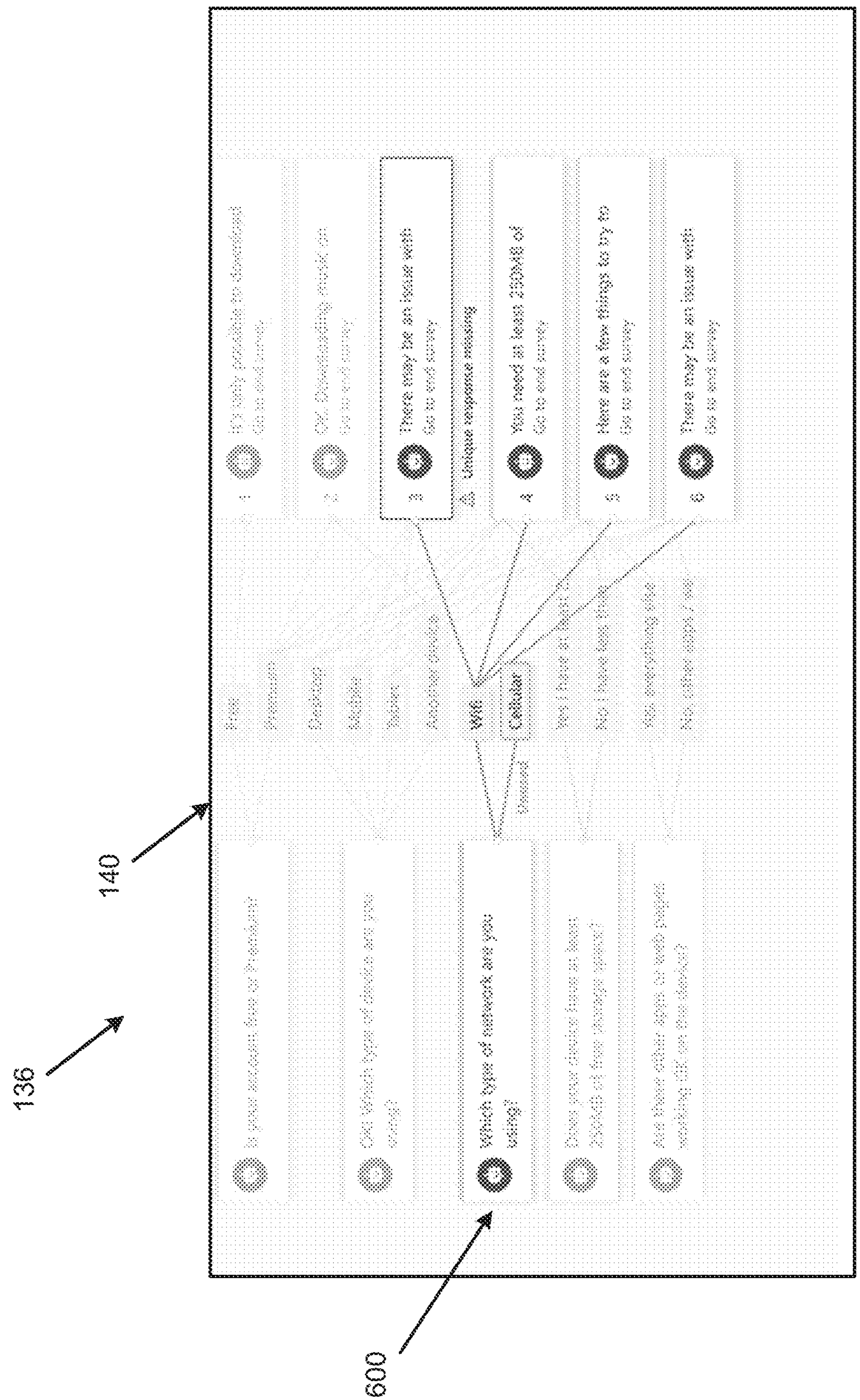
FIG. 6 illustrates another dependency display to illustrate operation of the matrix based bot implementation apparatus of FIG. 1 in accordance with an embodiment of the present disclosure.

FIG. 6 illustrates another dependency display to illustrate operation of the apparatus 100 in accordance with an embodiment of the present disclosure.

For the example of FIG. 6, a dependency path 600 may include a question "Which type of network are you using?", followed by responses "Wifi" and "Cellular", and further followed by scenarios 3-6 of FIG. 2.

As disclosed herein, the dependency path analysis module 142 may identify a dependency path of the plurality of dependency paths 136 that includes an unused response associated with the question. For example, as shown in FIG. 6, the dependency path 600 may be identified as a dependency path that includes an unused response (e.g., the response "Cellular"). For example, whereas the response "WiFi" is associated with scenarios 3-6, the response "Cellular" is unused (e.g., not associated any scenario).

The dependency path analysis module 142 may identify, based on a comparison of the identified dependency path to a plurality of pre-existing dependency paths 144, a closest pre-existing dependency path.

Assuming that the closest pre-existing dependency path includes the response "Cellular" associated with scenario-1, the conversation scenario matrix modification module 128 may generate, based on a difference of the dependency path from the closest pre-existing dependency path, a further modification to the conversation scenario matrix 108 to associate scenario-1 with the response "Cellular".

According to examples disclosed herein, the conversation scenario matrix modification module 128 may generate, based on the difference of the dependency path from the closest pre-existing dependency path, the further modification to the conversation scenario matrix 108 by determining whether a match percentage of the dependency path to the closest pre-existing dependency path exceeds a specified threshold (e.g., 95%). Based on a determination that the match percentage of the dependency path to the closest pre-existing dependency path exceeds the specified threshold, the dependency path analysis module 142 may modify the dependency path to correspond to the closest pre-existing dependency path (e.g., associating scenario-1 with the response "Cellular").

The response generation module 130 may utilize the plurality of bots 104 to generate the response 132 to the query 106 based on the further modified conversation scenario matrix. For example, assuming that the query 106 specifies "I am having trouble downloading music to my system", assuming that the response "Cellular" associated with scenario-1 is selected, the response 132 to the query 106 may be specified as "It's only possible to download . . . ".

Referring again to FIG. 6, the dependency path analysis module 142 may identify a dependency path of the plurality of dependency paths 136 that includes a missing unique response. For example, the question "Which type of network are you using?" includes response options "Wifi" and "Cellular", where the response option "Wifi" is associated with scenarios 3-6. Thus, none of the scenarios associated with the question "Which type of network are you using?" include a unique response (e.g., one of the scenarios 1-6, instead of two or more of the scenarios). In this regard, the dependency path analysis module 142 may identify, based on a comparison of the identified dependency path to the plurality of pre-existing dependency paths 144, a closest pre-existing dependency path.

Assuming that the closest pre-existing dependency path includes the response "Cellular" associated with scenario-1 as discussed above, the conversation scenario matrix modification module 128 may generate, based on a difference of the dependency path from the closest pre-existing dependency path, a further modification to the conversation scenario matrix 108 to include the response "Cellular" that provides a unique response to scenario-1. The response generation module 130 may utilize the plurality of bots 104 to generate the response 132 to the query based on the further modified conversation scenario matrix.

According to examples disclosed herein, the conversation scenario matrix modification module 128 may generate, based on the difference of the dependency path from the closest pre-existing dependency path, the further modification to the conversation scenario matrix 108 by determining whether a match percentage of the dependency path to the closest pre-existing dependency path exceeds a specified threshold (e.g., 95%). Based on a determination that the match percentage of the dependency path to the closest pre-existing dependency path exceeds the specified threshold, the dependency path analysis module 142 may modify the dependency path, and thus the conversation scenario matrix 108, to correspond to the closest pre-existing dependency path (e.g., including the response "Cellular" that provides a unique response to scenario-1).

With respect to the dependency display 140, the dependency display 140 may include dependencies that include a first list (e.g., left column of FIGS. 5 and 6) that includes questions asked by the bot. A second list (e.g., middle column of FIGS. 5 and 6) may include the responses associated with the questions. Further, a third list (e.g., right column of FIGS. 5 and 6) may include the solutions covered by the conversation scenario matrix 108 (e.g., the specific scenarios associated with each set of question-response pairs). The dependency display 140 may facilitate identification of response values which have not been used (e.g., the unused response as discussed above). For example, the response values which have not been used may represent responses in the middle column which are not connected to a solution (e.g., scenario) in the right-hand column with a line. Further, the dependency display 140 may facilitate analysis of the density of mappings (e.g., with respect to missing unique response as discussed above) of responses to solutions (e.g., scenarios) to facilitate determination of whether to break a question down to a set of more granular questions which may translate into a shorter conversation for a user resulting in a solution to their issue.

Figure 7:
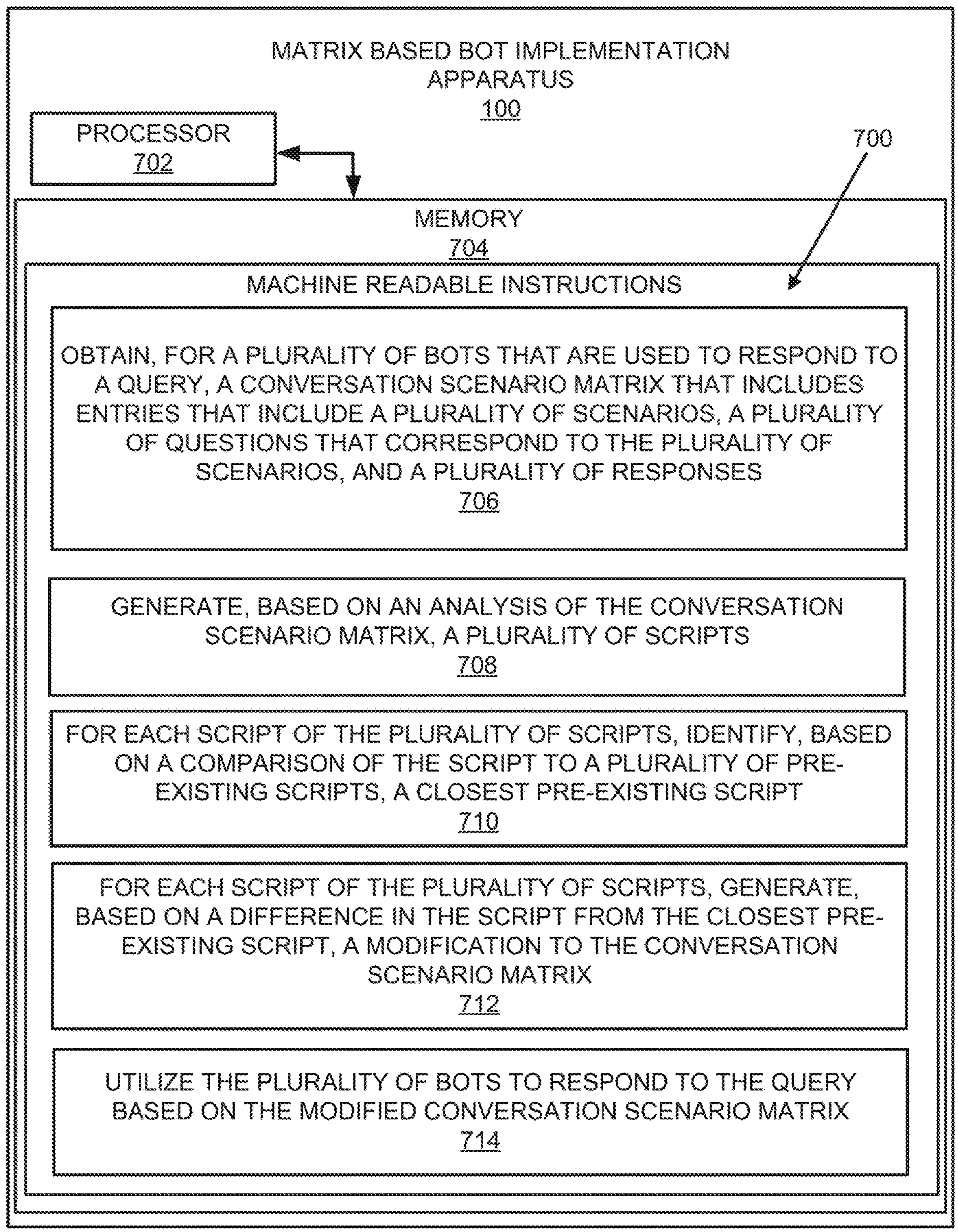
FIG. 7 illustrates an example block diagram for matrix based bot implementation in accordance with an embodiment of the present disclosure.
Figure 9:
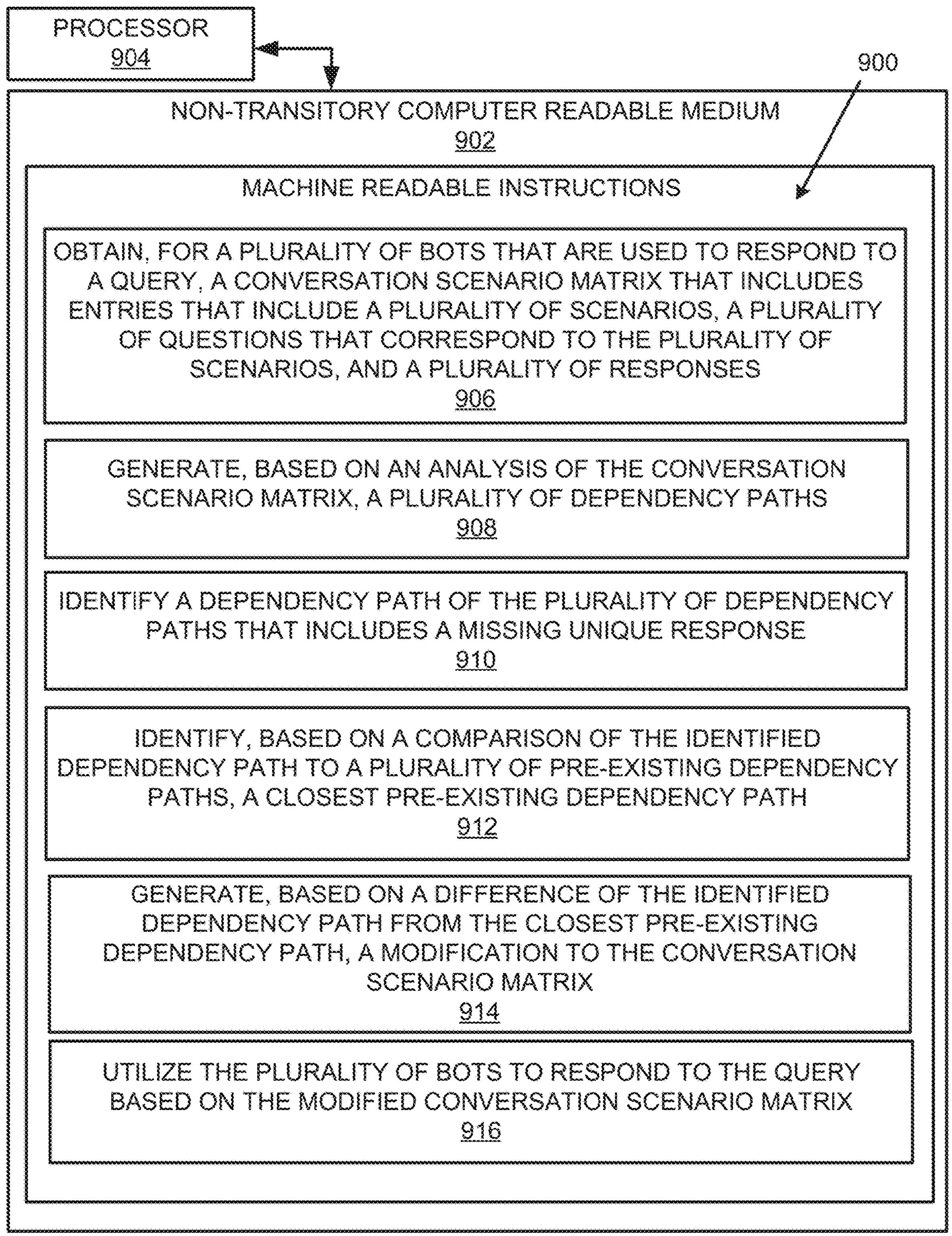
FIG. 9 illustrates a further example block diagram for matrix based bot implementation in accordance with another embodiment of the present disclosure.

FIGS. 7-9 respectively illustrate an example block diagram 700, a flowchart of an example method 800, and a further example block diagram 900 for matrix based bot implementation, according to examples. The block diagram 700, the method 800, and the block diagram 900 may be implemented on the apparatus 100 described above with reference to FIG. 1 by way of example and not of limitation. The block diagram 700, the method 800, and the block diagram 900 may be practiced in other apparatus. In addition to showing the block diagram 700, FIG. 7 shows hardware of the apparatus 100 that may execute the instructions of the block diagram 700. The hardware may include a processor 702, and a memory 704 storing machine readable instructions that when executed by the processor cause the processor to perform the instructions of the block diagram 700. The memory 704 may represent a non-transitory computer readable medium. FIG. 8 may represent an example method for matrix based bot implementation, and the steps of the method. FIG. 9 may represent a non-transitory computer readable medium 902 having stored thereon machine readable instructions to provide matrix based bot implementation according to an example. The machine readable instructions, when executed, cause a processor 904 to perform the instructions of the block diagram 900 also shown in FIG. 9.

The processor 702 of FIG. 7 and/or the processor 904 of FIG. 9 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 902 of FIG. 9), such as hardware storage devices (e.g., RAM (random access memory), ROM (read only memory), EPROM (erasable, programmable ROM), EEPROM (electrically erasable, programmable ROM), hard drives, and flash memory). The memory 704 may include a RAM, where the machine readable instructions and data for a processor may reside during runtime.

Referring to FIGS. 1-7, and particularly to the block diagram 700 shown in FIG. 7, the memory 704 may include instructions 706 to obtain, for a plurality of bots 104 that are used to respond to a query 106, a conversation scenario matrix 108 that includes entries that include a plurality of scenarios 110, a plurality of questions 112 that correspond to the plurality of scenarios 110, and a plurality of responses 114.

The processor 702 may fetch, decode, and execute the instructions 708 to generate, based on an analysis of the conversation scenario matrix 108, a plurality of scripts 118.

For each script of the plurality of scripts, the processor 702 may fetch, decode, and execute the instructions 710 to identify, based on a comparison of the script to a plurality of pre-existing scripts 126, a closest pre-existing script.

For each script of the plurality of scripts, the processor 702 may fetch, decode, and execute the instructions 712 to generate, based on a difference in the script from the closest pre-existing script, a modification to the conversation scenario matrix 108.

For each script of the plurality of scripts, the processor 702 may fetch, decode, and execute the instructions 714 to utilize the plurality of bots 104 to generate a response 132 to the query 106 based on the modified conversation scenario matrix.

Referring to FIGS. 1-6 and 8, and particularly FIG. 8, for the method 800, at block 802, the method may include obtaining, for a plurality of bots 104 that are used to respond to a query 106, a conversation scenario matrix 108 that includes entries that include a plurality of scenarios 110, a plurality of questions 112 that correspond to the plurality of scenarios 110, and a plurality of responses 114.

At block 804, the method may include generating, based on the analysis of the conversation scenario matrix 108, a plurality of dependency paths 136.

At block 806, the method may include identifying a dependency path of the plurality of dependency paths 136 that includes an unused response associated with the question.

At block 808, the method may include identifying, based on a comparison of the identified dependency path to a plurality of pre-existing dependency paths 144, a closest pre-existing dependency path.

At block 810, the method may include generating, based on a difference of the identified dependency path from the closest pre-existing dependency path, a modification to the conversation scenario matrix 108.

At block 812, the method may include utilizing the plurality of bots 104 to generate the response 132 to the query 106 based on the modified conversation scenario matrix.

Referring to FIGS. 1-6 and 9, and particularly FIG. 9, for the block diagram 900, the non-transitory computer readable medium 902 may include instructions 906 to obtain, for a plurality of bots 104 that are used to respond to a query 106, a conversation scenario matrix 108 that includes entries that include a plurality of scenarios 110, a plurality of questions 112 that correspond to the plurality of scenarios 110, and a plurality of responses 114.

The processor 904 may fetch, decode, and execute the instructions 908 to generate, based on the analysis of the conversation scenario matrix 108, a plurality of dependency paths 136.

The processor 904 may fetch, decode, and execute the instructions 910 to identify a dependency path of the plurality of dependency paths 136 that includes a missing unique response.

The processor 904 may fetch, decode, and execute the instructions 912 to identify, based on a comparison of the identified dependency path to the plurality of pre-existing dependency paths 144, a closest pre-existing dependency path.

The processor 904 may fetch, decode, and execute the instructions 914 to generate, based on a difference of the identified dependency path from the closest pre-existing dependency path, a modification to the conversation scenario matrix 108.

The processor 904 may fetch, decode, and execute the instructions 916 to generate the response 132 to the query based on the modified conversation scenario matrix.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. An apparatus comprising:

a processor; and a computer readable medium on which is stored machine readable instructions that cause the processor to:

obtain, for a plurality of bots that are used to respond to a query, a conversation scenario matrix that comprises entries, wherein the entries include a plurality of scenarios that represent sub-issues of a primary issue addressed in the conversation scenario matrix, a plurality of questions corresponding to the plurality of scenarios, and a plurality of responses, wherein the plurality of scenarios, the plurality of questions, and the plurality of responses are used to generate a plurality of scripts;

for each script of the plurality of scripts, identify, based on a comparison of a script to a plurality of pre-existing scripts, a closest pre-existing script;

for each script of the plurality of scripts, generate, based on a difference in the script from the closest pre-existing script, a modification to the conversation scenario matrix; and utilize the plurality of bots to respond to the query based on the modified conversation scenario matrix.

2. The apparatus according to claim 1, wherein the instructions further cause the processor to:

generate, based on the difference in a script from the closest pre-existing script, a modification to the conversation scenario matrix by modifying at least one of at least one question, at least one response, or at least one scenario of the script to correspond to the closest pre-existing script.

3. The apparatus according to claim 1, wherein the instructions further cause the processor to:

generate a visual display of at least one script of the plurality of scripts.

4. The apparatus according to claim 1, wherein the instructions further cause the processor to:

generate, based on an analysis of the conversation scenario matrix, a plurality of dependency paths, wherein each dependency path of the plurality of dependency paths includes a question of a plurality of questions, followed by responses associated with the question, and further followed by at least one scenario associated with the responses associated with the question.

5. The apparatus according to claim 4, wherein the instructions further cause the processor to:

generate a visual display of at least one dependency path of the plurality of dependency paths.

6. The apparatus according to claim 4, wherein the instructions further cause the processor to:

identify a dependency path of the plurality of dependency paths that includes an unused response associated with the question;

identify, based on a comparison of the identified dependency path to a plurality of pre-existing dependency paths, a closest pre-existing dependency path;

generate, based on a difference of the identified dependency path from the closest pre-existing dependency path, another modification to the conversation scenario matrix; and utilize the plurality of bots to respond to the query based on the another modified conversation scenario matrix.

7. The apparatus according to claim 6, wherein the instructions to generate, based on the difference of the identified dependency path from the closest pre-existing dependency path, the modification to the conversation scenario matrix, further cause the processor to:

determine whether a match percentage of the identified dependency path to the closest pre-existing dependency path exceeds a specified threshold; and based on a determination that the match percentage of the identified dependency path to the closest pre-existing dependency path exceeds the specified threshold, modify the identified dependency path to correspond to the closest pre-existing dependency path.

8. The apparatus according to claim 4, wherein the instructions further cause the processor to:

identify a dependency path of the plurality of dependency paths that includes a missing unique response;

identify, based on a comparison of the identified dependency path to a plurality of pre-existing dependency paths, a closest pre-existing dependency path;

generate, based on a difference of the identified dependency path from the closest pre-existing dependency path, a modification to the conversation scenario matrix; and utilize the plurality of bots to respond to the query based on the modified conversation scenario matrix.

9. The apparatus according to claim 8, wherein the instructions to generate, based on the difference of the identified dependency path from the closest pre-existing dependency path, the modification to the conversation scenario matrix, further cause the processor to:

determine whether a match percentage of the identified dependency path to the closest pre-existing dependency path exceeds a specified threshold; and based on a determination that the match percentage of the identified dependency path to the closest pre-existing dependency path exceeds the specified threshold, modify the identified dependency path to correspond to the closest pre-existing dependency path.

10. A computer-implemented method comprising:

obtaining, by a processor, for a plurality of bots that are used to respond to a query, a conversation scenario matrix that comprises entries, wherein the entries include a plurality of scenarios that represent sub-issues of a primary issue addressed in the conversation scenario matrix, a plurality of questions corresponding to the plurality of scenarios, and a plurality of responses, wherein the plurality of scenarios, the plurality of questions, and the plurality of responses are used to generate a plurality of scripts;

for each script of the plurality of scripts, identifying, based on a comparison of a script to a plurality of pre-existing scripts, a closest pre-existing script;

for each script of the plurality of scripts, generating, based on a difference in the script from the closest pre-existing script, a modification to the conversation scenario matrix; and utilizing, by the processor, the plurality of bots to respond to the query based on the modified conversation scenario matrix.

11. The computer-implemented method according to claim 10, further comprising:

generating, based on a difference of an identified dependency path from a closest pre-existing dependency path, a modification to the conversation scenario matrix by:

determining whether a match percentage of the identified dependency path to the closest pre-existing dependency path exceeds a specified threshold; and based on a determination that the match percentage of the identified dependency path to the closest pre-existing dependency path exceeds the specified threshold, modifying the identified dependency path to correspond to the closest pre-existing dependency path.

12. The computer-implemented method according to claim 10, further comprising:

generating a visual display of at least one dependency path of a plurality of dependency paths.

13. The computer-implemented method according to claim 10, wherein generating, based on the difference in the script from the closest pre-existing script, the modification to the conversation scenario matrix further comprises:

modifying at least one of: at least one question, at least one response, or at least one scenario of the script to correspond to the closest pre-existing script.

14. The computer-implemented method according to claim 10, further comprising:

generating a visual display of at least one script of the plurality of scripts.

15. A non-transitory computer readable medium on which is stored machine readable instructions that when executed by a processor, cause the processor to:

obtain, for a plurality of bots that are used to respond to a query, a conversation scenario matrix that comprises entries, wherein the entries include a plurality of scenarios that represent sub-issues of a primary issue addressed in the conversation scenario matrix, a plurality of questions corresponding to the plurality of scenarios, and a plurality of responses, wherein the plurality of scenarios, the plurality of questions, and the plurality of responses are used to generate a plurality of scripts;

for each script of a plurality of scripts of the conversation scenario matrix, identify, based on a comparison of a script to a plurality of pre-existing scripts, a closest pre-existing script;

for each script of the plurality of scripts, generate, based on a difference in the script from the closest pre-existing script, a modification to the conversation scenario matrix; and utilize the plurality of bots to respond to the query based on the modified conversation scenario matrix.

16. The non-transitory computer readable medium according to claim 15, wherein the instructions further cause the processor to:

generate, based on a difference of an identified dependency path from a closest pre-existing dependency path, a modification to the conversation scenario matrix:

determine whether a match percentage of the identified dependency path to the closest pre-existing dependency path exceeds a specified threshold; and based on a determination that the match percentage of the identified dependency path to the closest pre-existing dependency path exceeds the specified threshold, modify the identified dependency path to correspond to the closest pre-existing dependency path.

17. The non-transitory computer readable medium according to claim 15, wherein the instructions further cause the processor to:

generate a visual display of at least one dependency path of a plurality of dependency paths generated from the conversation scenario matrix.

18. The non-transitory computer readable medium according to claim 15, wherein the instructions to generate, based on the difference in the script from the closest pre-existing script, the modification to the conversation scenario matrix, further cause the processor to:

modify at least one of: at least one question, at least one response, or at least one scenario of the script to correspond to the closest pre-existing script.

* * * * *